(12) United States Patent
Wang et al.

(10) Patent No.: US 7,533,391 B2
(45) Date of Patent: May 12, 2009

(54) DISC EMERGENT EJECTING MECHANISM FOR OPTICAL DISC DRIVE

(75) Inventors: Ta Hsiang Wang, Hsinchu (TW); Yi Feng Lin, Hsinchu (TW); Chien Wei Huang, Hsinchu (TW); Yung Han Wu, Hsinchu (TW); Chun Ying Wu, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 409 days.

(21) Appl. No.: 11/447,090

(22) Filed: Jun. 6, 2006

(65) Prior Publication Data

US 2007/0186219 A1    Aug. 9, 2007

(30) Foreign Application Priority Data

Feb. 27, 2006    (TW) .............................. 95106633 A

(51) Int. Cl.
G11B 17/03    (2006.01)

(52) U.S. Cl. ..................................... 720/601

(58) Field of Classification Search ................. 720/607, 720/601

See application file for complete search history.

(56) References Cited

U.S. PATENT DOCUMENTS 6,266,311 B1*    7/2001    Song et al. .................. 720/609
2006/0242657 A1*    10/2006    Kuo et al. .................... 720/607

* cited by examiner

*Primary Examiner*—David D Davis
(74) *Attorney, Agent, or Firm*—Troxell Law Office PLLC

(57) ABSTRACT

A disc emergent ejecting mechanism for an optical disc drive is disclosed that includes a drive motor; a first gear set in meshing engagement with the drive motor; an advancing and retracting member; a second gear set in meshing engagement with the advancing and retracting member; and a clutch assembly including a clutch gear engaged with the first and the second gear sets for transmitting torque from the drive motor to the advancing and retracting member. During a disc emergent ejecting operation, the clutch gear is moved to disengage with the second gear set.

6 Claims, 4 Drawing Sheets

DISC EMERGENT EJECTING MECHANISM FOR OPTICAL DISC DRIVE

This Non-provisional application claims priority under 35 U.S.C. §119(a) on patent application No(s). 095106633 filed in Taiwan, Republic of China on Feb. 27, 2006, the entire contents of which are thereby incorporated by reference.

BACKGROUND OF THE INVENTION

1. Field of Invention

The present invention relates to a disc emergent ejecting mechanism and more particularly to a disc emergent ejecting mechanism for manually ejecting the disc in an emergency (e.g., power interrupt or any other situations).

2. Related Art

A conventional optical disc drive, as shown in FIG. 1, comprises a spindle motor S for rotating and positioning a loaded disc (e.g., CD (compact disc), digital video disc (DVD), or the like), an optical pickup unit P for reading data stored on the disc, a drive motor M, a gear assembly G driven by the drive motor M, and an advancing and retracting member D actuated by the gear assembly G to load the disc or unload the same.

Unfortunately, there is no means provided by the prior optical disc drive to eject a loaded disc from the drive when the drive is inoperative due to malfunction, power interrupt, or any other reasons. This is because disc loading is driven by the actuated advancing and retracting member D when the drive motor M rotates clockwise, and to the contrary disc unloading is driven by the actuated advancing and retracting member D when the drive motor M rotates counterclockwise. Thus, the gear assembly G is designed to have a high speed reduction ratio, and the drive motor M is designed to output a large torque to effectively drive the advancing and retracting member D. Both the advancing and retracting member D and the drive motor M are in meshing engagement with the gear assembly G. Thus, a person cannot apply a sufficient force to overcome the torque loaded on the advancing and retracting member D by the drive motor M through the gear assembly G. Therefore, there is no means provided by the prior optical disc drive to manually actuating the advancing and retracting member D to eject a loaded disc from the optical disc drive in an emergency.

Thus, it is desirable to provide a manual disc emergent ejecting mechanism to overcome the inadequacy of the prior art and contribute significantly to the advancement of the art.

SUMMARY OF THE INVENTION

It is therefore an object of the present invention to provide a disc emergent ejecting mechanism disposed in an optical disc drive for manually ejecting the disc when the optical disc drive is inoperative due to malfunction, power interrupt, or any other reasons.

The present invention provides a disc emergent ejecting mechanism disposed in an optical disc drive which includes a disc carrying in/out mechanism for disc loading and unloading. The disc emergent ejecting mechanism comprises a drive motor; a first gear set in meshing engagement with the drive motor; an advancing and retracting member for actuating the disc carrying in/out mechanism; a second gear set in meshing engagement with the advancing and retracting member; and a clutch assembly having a clutch gear which is moveable between a first position where the clutch gear is engaged with both the first and the second gear sets, and a second position where the clutch gear is disengaged with the second gear set.

In one aspect of the present invention, the clutch assembly further comprises a slide member including an guiding groove; and a link connected to the guiding groove and the clutch gear; wherein when the slide member is pushed to move in the disc emergent ejecting operation, the link is driven to move along the guiding groove, and in turn to move the clutch gear from the first position to the second position.

In another aspect of the present invention, the slide member further comprises a pin provided in a groove disposed in the optical disc drive such that manually pushing the slide member will slide the pin along the groove.

In a further aspect of the present invention, the slide member further comprises a resilient member disposed within the groove and provides a compressing force on the pin of the slide member.

The above and other objects, features and advantages of the present invention will become apparent from the following detailed description taken with the accompanying drawings.

DETAILED DESCRIPTION OF THE INVENTION

Figure 1:
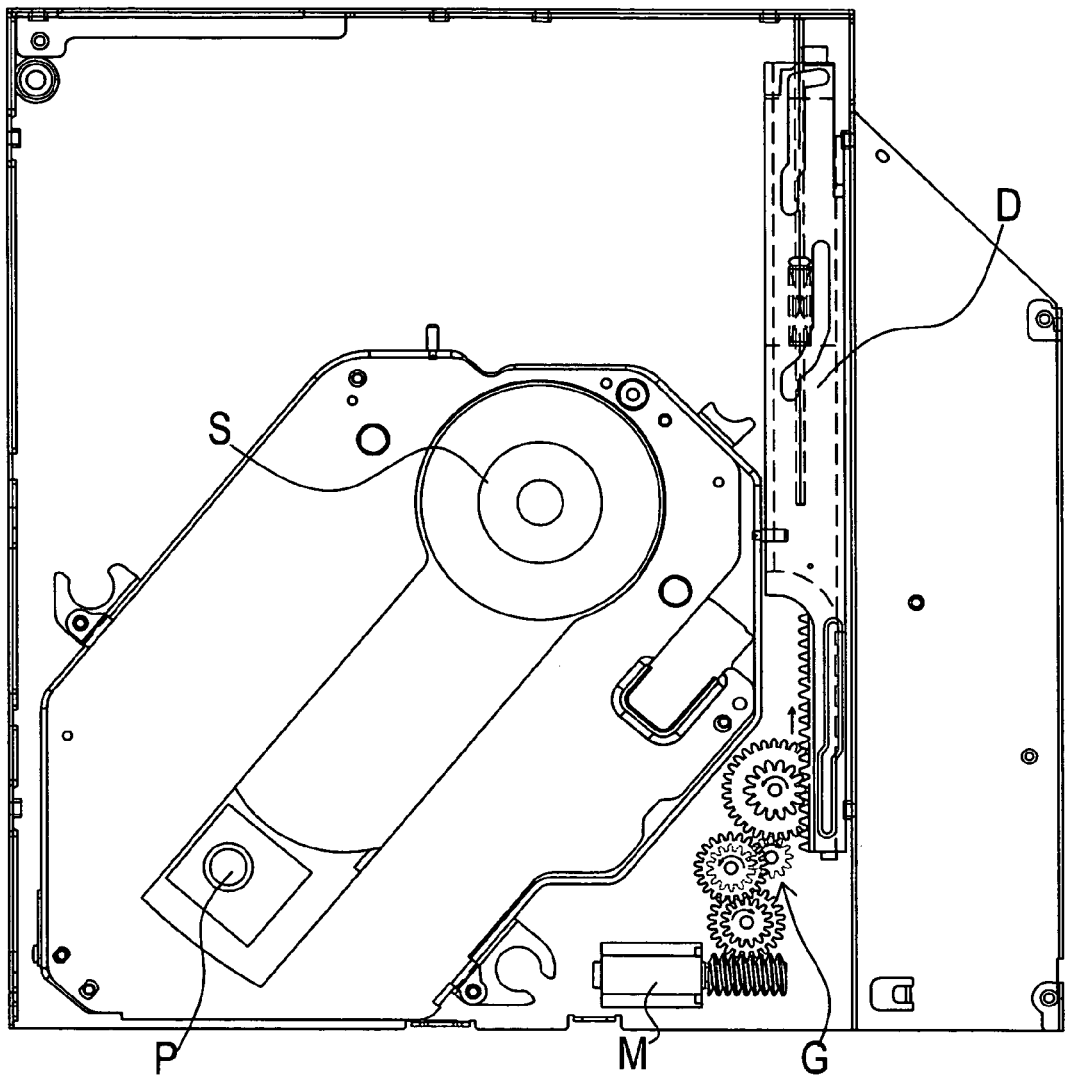
FIG. 1 is a top plan view of a conventional optical disc drive.
Figure 2:
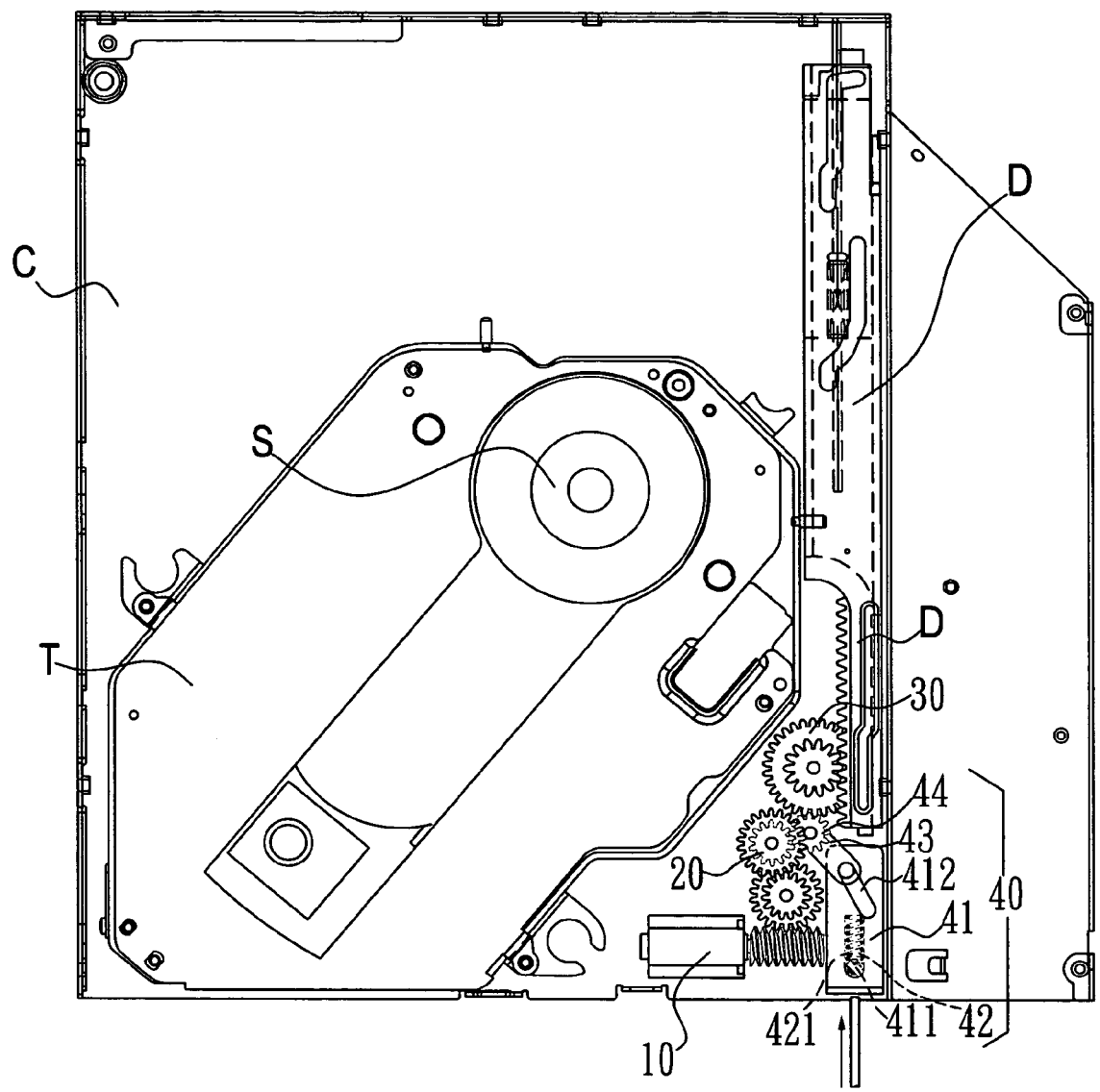
FIG. 2 is a top plan view of a disc emergent ejecting mechanism according to a preferred embodiment of the invention.
Figure 3:
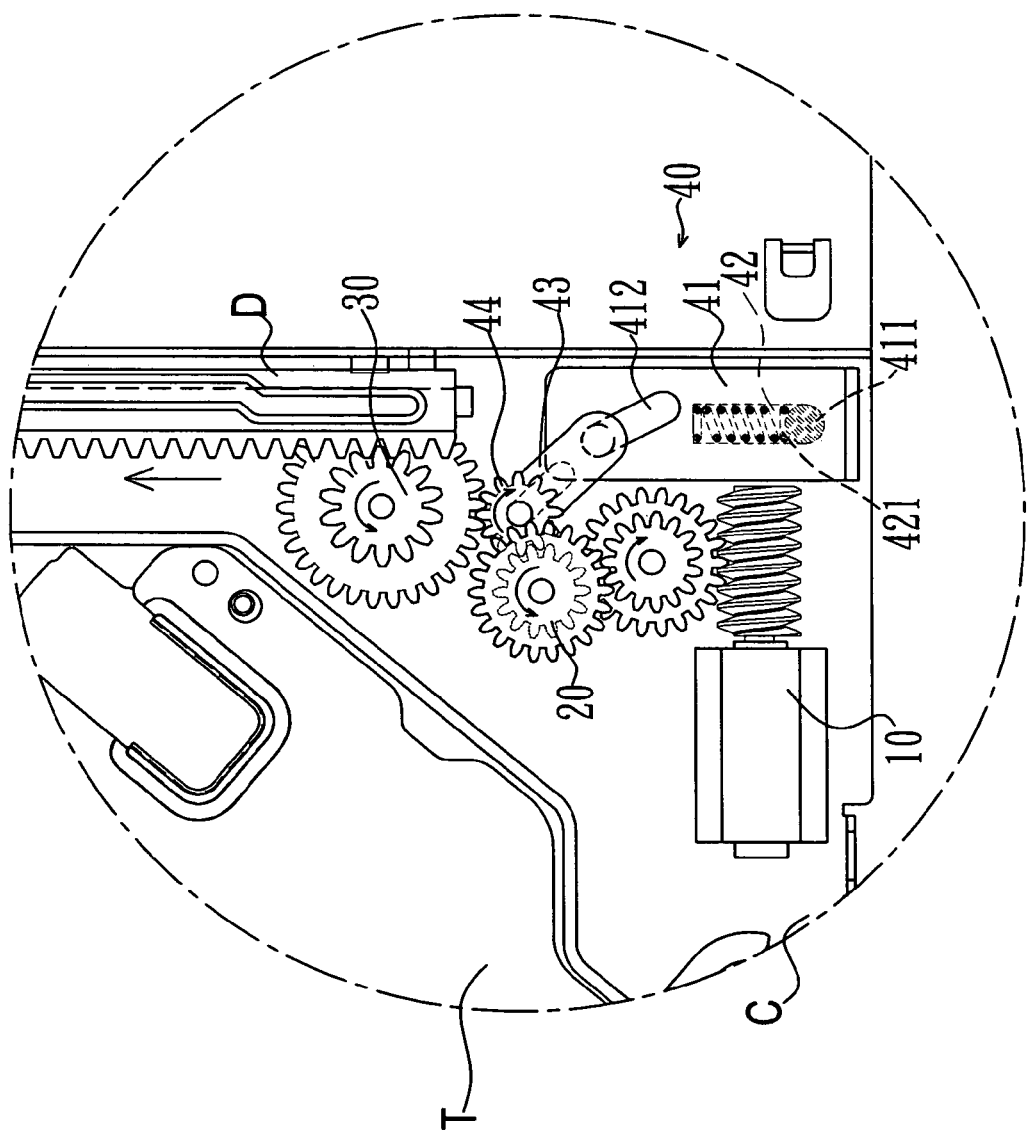
FIG. 3 is an enlarged view of part of the disc emergent ejecting mechanism in FIG. 2 where the clutch assembly is engaged with both the first and second gear sets.

Referring to FIGS. 2 and 3, a disc emergent ejecting mechanism in accordance with a preferred embodiment of the invention is shown. The disc emergent ejecting mechanism is implemented in an optical disc drive in this embodiment.

The optical disc drive used in the present invention is a slot-in type optical disc drive. The optical disc drive comprises a chassis C, a traverse chassis T provided with a spindle motor S and an optical pickup unit, a disc carrying in/out mechanism (not shown), and a disc emergent ejecting mechanism as the subject of the invention. The disc emergent ejecting mechanism of the embodiment comprises a drive motor 10, a first gear set 20, a second gear set 30, a clutch assembly 40, and an advancing and retracting member D provided on the chassis C and connected to one side of the traverse chassis T. Note that each of the first and the second gear sets 20 and 30 comprises one or more gears.

When the advancing and retracting member D is driven to retract by the drive motor 10 through the first and the second gear sets 20 and 30, it actuates the disc carrying in/out mechanism to load a disc and then actuates the traverse chassis T to clamp the loaded disc. Alternatively, when the advancing and retracting member D is driven to advance by the drive motor 10 through the first and the second gear sets 20 and 30, it actuates the traverse chassis T to release the clamped disc and then actuates the disc carrying in/out mechanism to unload the disc. In detail, the drive motor 10 actuates when a disc is intended to be loaded into the optical disc drive. The advancing and retracting member D thus retracts as driven by the second gear set 30 to actuate the disc carrying in/out mechanism to load the disc. Next, the traverse chassis T is lifted and the spindle motor S is activated to clamp the loaded disc in position. Finally, the optical pickup unit is activated to read the information on the disc.

For unloading the disc, a person may operate to cause the drive motor 10 to rotate reversely. The advancing and retracting member D then advances. Also, the disc carrying in/out mechanism is activated to unload the disc. These disc loading and unloading operations are well known in the art and a detailed description thereof is therefore deemed unnecessary.

As shown in FIGS. 2 and 3, the first gear set 20 is in meshing engagement with a rotating shaft of the drive motor 10. The advancing and retracting member D has a rack in meshing engagement with the second gear set 30. The clutch assembly 40 comprises a slide member 41, a link 43, and a clutch gear 44. The slide member 41 comprises a pin 411 connected to a groove 42 provided in the optical disc drive such that the slide member 41 is adapted to move along the groove 42. A compression spring 421 is disposed within the groove 42 and provides a compressing force on the pin 411 of the slide member 41. Thus, as the slide member 41 is pushed to move along the groove 42, the compression spring 421 is compressed by the pin 411, and the slide member 41 may return to its original position by the stored elastic force of the compression spring 421.

The slide member 41 further comprises an inclined guiding groove 412 connecting with one end of the link 43 so that the link 43 is moved along the inclined guiding groove 412 when the slide member 41 is moved. The clutch gear 44 is pivotably disposed on the other end of the link 43. In a normal condition, the clutch gear 44 is in meshing engagement with both the first and the second gear sets 20 and 30. Thus, a rotation of the drive motor 10 may retract the advancing and retracting member D to load a disc through the meshing engagements of the first gear set 20, the clutch gear 44, and the second gear set 30. To the contrary, a reverse rotation of the drive motor 10 may advance the advancing and retracting member D to unload the CD through the meshing engagements of the first gear set 20, the clutch gear 44, and the second gear set 30.

Figure 4:
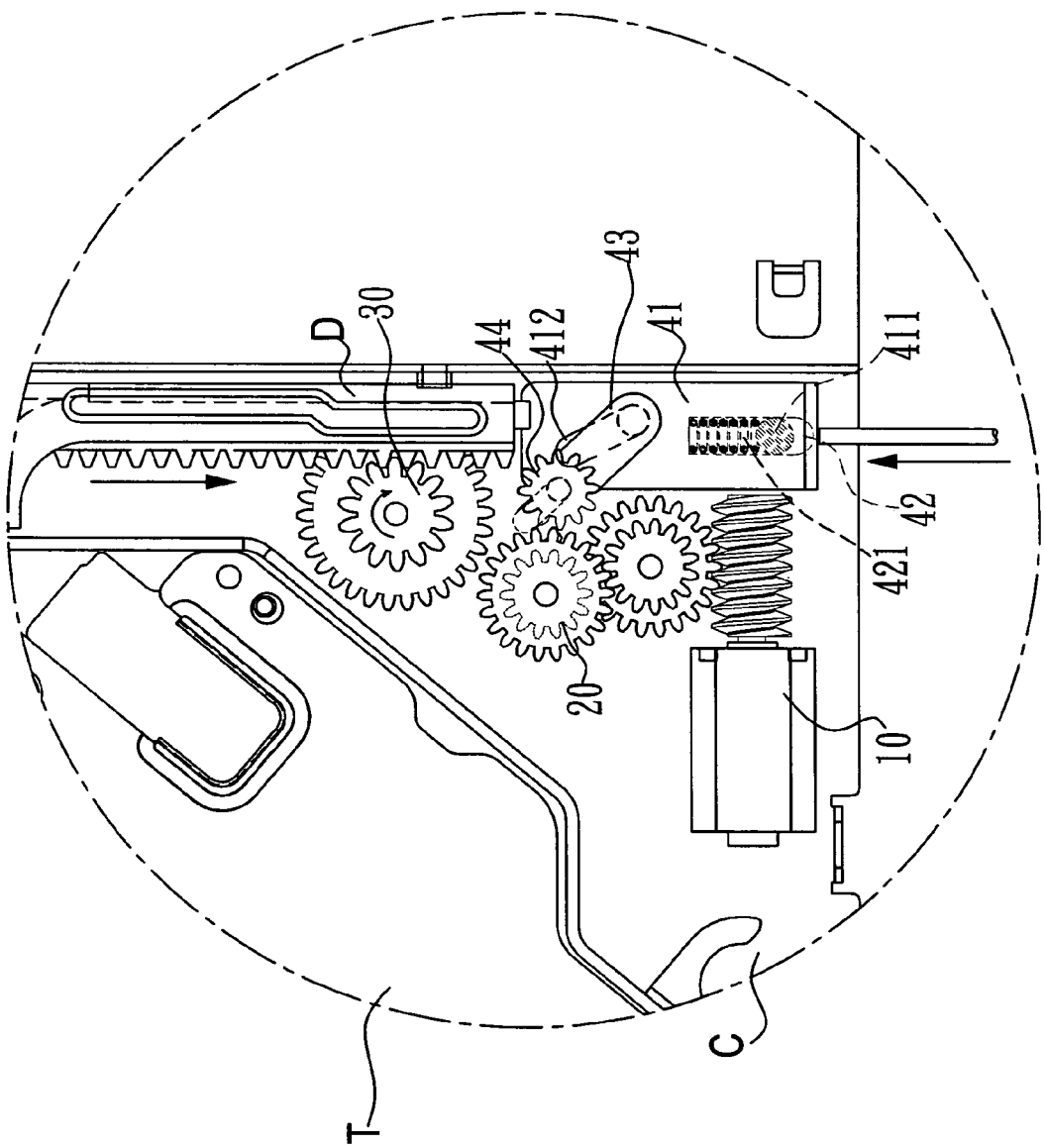
FIG. 4 is an enlarged view of part of the disc emergent ejecting mechanism in FIG. 2 where the clutch assembly is disengaged with the second gear set in response to the optical drive being inoperative.

Referring to FIG. 4 in conjunction with FIG. 3, it is possible that the optical disc drive is inoperative due to malfunction, power interrupt, or any other reasons. Thus, it fails to eject the loaded disc from the optical disc drive by driving the motor 10 when the drive is inoperative. In this case, a person may use the sharp end of a tool (e.g., screwdriver or the like) to push the slide member 41 to cause it to slide inward along the groove 42. Next, the link 43 slides along the inclined guiding groove 412 and away form the first and the second gear sets 20 and 30. As such, the clutch gear 44 disengages with both the first and the second gear sets 20 and 30, and both the second gear set 30 and the advancing and retracting member D are not constrained by the torque of the motor 10. In this position, the advancing and retracting member D is moved to unload the disc by an elastic member (not shown) which provide a force on the advancing and retracting member D at a direction for unloading the disc. In this disc forcing ejection process, a large torque outputted by the drive motor 10 will not transmit to both the second gear set 30 and the advancing and retracting member D through the first gear set 20 due to the disengagement of the clutch gear 44. This can protect both the drive motor 10 and the first gear set 20 and can effectively eject the disc manually.

As the person stops pushing the slide member 41 and remove the tool after successfully ejecting the disc. Thereafter, the slide member 41 may return to its original position by the stored elastic force of the compression spring 421 (i.e., the compressed compression spring 421 expands). As such, the link 43 slides along the inclined guiding groove 412 to close to the first and the second gear sets 20 and 30. Hence, the clutch gear 44 engages with both the first and the second gear sets 20 and 30 again, i.e., both the second gear set 30 and the advancing and retracting member D are in meshing engagement with the drive motor 10 through the first gear set 20 and the clutch gear 44.

While the invention herein disclosed has been described by means of specific embodiments, numerous modifications and variations could be made thereto by those skilled in the art without departing from the scope and spirit of the invention set forth in the claims.

What is claimed is:

1. A disc emergent ejecting mechanism disposed in an optical disc drive including a disc carrying in/out mechanism for disc loading and unloading, the disc emergent ejecting mechanism comprises:
    a drive motor;
    a first gear set in meshing engagement with the drive motor;
    an advancing and retracting member for actuating the disc carrying in/out mechanism;
    a second gear set in meshing engagement with the advancing and retracting member; and
    a clutch assembly including a slide member including a guiding groove and movable in a moving direction, a link connected to the guiding groove and movable along the guiding groove, and a clutch gear disposed on the link; the clutch gear is in a first position where the clutch gear is engaged with both the first and the second gear sets for transmitting torque from the drive motor to the advancing and retracting member;
    wherein during a disc emergent ejecting operation, the clutch gear is moved from the first position to a second position where the clutch gear is disengaged with the second gear set.

2. The disc emergent ejecting mechanism of claim 1, wherein when the slide member is pushed to move in the disc emergent ejecting operation, the link is driven to move along the guiding groove, and in turn to move the clutch gear from the first position to the second position.

3. The disc emergent ejecting mechanism of claim 2, wherein the guiding groove is disposed at an angle relative to the moving direction of the slide member.

4. The disc emergent ejecting mechanism of claim 2, wherein the slide member further comprises a pin provided in a groove disposed in the optical disc drive such that manually pushing the slide member will slide the pin along the groove.

5. The disc emergent ejecting mechanism of claim 4, wherein the slide member further comprises a resilient member disposed within the groove and provides a compressing force on the pin of the slide member.

6. The disc emergent ejecting mechanism of claim 1, wherein each of the first and the second gear sets comprises one or more gears.

* * * * *